(12) United States Patent
Chen et al.

(10) Patent No.: US 8,314,159 B2
(45) Date of Patent: *Nov. 20, 2012

(54) BLOWING AGENT COMPOSITION OF HYDROCHLOROFLUOROOLEFIN

(75) Inventors: Benjamin Bin Chen, Wayne, PA (US); Maher Y. Elsheikh, Wayne, PA (US); Philippe Bonnet, Lower Merion, PA (US); Brett L. Van Horn, King of Prussia, PA (US); Joseph S. Costa, Gilbertsville, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/532,183

(22) PCT Filed: Mar. 28, 2008

(86) PCT No.: PCT/US2008/058600
§ 371 (c)(1),
(2), (4) Date: Sep. 21, 2009

(87) PCT Pub. No.: WO2008/121783
PCT Pub. Date: Oct. 9, 2008

(65) Prior Publication Data
US 2010/0105788 A1     Apr. 29, 2010

Related U.S. Application Data

(60) Provisional application No. 60/908,751, filed on Mar. 29, 2007, provisional application No. 60/972,037, filed on Sep. 13, 2007.

(51) Int. Cl.
*C08J 9/00* (2006.01)
*C08J 9/14* (2006.01)

(52) U.S. Cl. ............... 521/98; 521/131; 252/182.15

(58) Field of Classification Search ............ 521/98, 521/131; 252/182.15
See application file for complete search history.

(56) References Cited

U.S. PATENT DOCUMENTS

| 2006/0142173 A1 | 6/2006 | Johnson et al. |
| 2006/0243945 A1 | 11/2006 | Minor et al. |
| 2007/0010592 A1* | 1/2007 | Bowman et al. ............ 521/131 |
| 2008/0157022 A1 | 7/2008 | Singh et al. |

FOREIGN PATENT DOCUMENTS

| WO | WO 2007/002625 | 1/2007 |
| WO | WO 2007/002703 | 1/2007 |

OTHER PUBLICATIONS

Mortelmans, K. et al., The Ames Salmonella/Microsome Mutagenicity Assay, Mutation Research, 455 2000, pp. 29-60.
Niyogi, D., et al., Water Blown Free Rise Polyurethane Foams, Polymer Engineering & Science, vol. 39, Issue 1, Jan. 1999, pp. 199-209.

* cited by examiner

*Primary Examiner* — Randy Gulakowski
*Assistant Examiner* — Kara Boyle
(74) *Attorney, Agent, or Firm* — Steven D. Boyd

(57) ABSTRACT

A blowing agent for thermosetting foams is disclosed. The blowing agent is predominately the trans isomer of the hydrochlorofluoroolefin (HCFO) HFCO-1233zd alone or in combination with a hydrofluoroolefin (HFO), hydrofluorocarbon (HFC), hydrochlorofluoroolefin (HCFO), a hydrocarbon. The blowing agent is effective as a blowing agent in the manufacture of thermosetting foams.

9 Claims, No Drawings

BLOWING AGENT COMPOSITION OF HYDROCHLOROFLUOROOLEFIN

FIELD OF THE INVENTION

The present invention relates to blowing agents for thermosetting foams. More particularly, the present invention relates to the use of the hydrochlorofluoroolefin (HCFO) HCFO-1233zd alone or in a combination as a blowing agent in the manufacture of thermosetting foams. The HCFO-1233zd of the present invention is predominantly the trans isomer.

BACKGROUND OF THE INVENTION

The Montreal Protocol for the protection of the ozone layer, signed in October 1987, mandated the phase out of the use of chlorofluorocarbons (CFCs). Materials more "friendly" to the ozone layer, such as hydrofluorocarbons (HFCs) eg HFC-134a replaced chlorofluorocarbons. The latter compounds have proven to be green house gases, causing global warming and were regulated by the Kyoto Protocol on Climate Change, signed in 1998. The emerging replacement materials, hydrofluoropropenes, were shown to be environmentally acceptable i.e. has zero ozone depletion potential (ODP) and acceptable low global warming potential (GWP).

Currently used blowing agents for thermoset foams include HFC-134a, HFC-245fa, HFC-365mfc that have relatively high global warming potential, and hydrocarbons such as pentane isomers which are flammable and have low energy efficiency. Therefore, new alternative blowing agents are being sought. Halogenated hydroolefinic materials such as hydrofluoropropenes and/or hydrochlorofluoropropenes have generated interest as replacements for HFCs. The inherent chemical instability of these materials in the lower atmosphere provides the low global warming potential and zero or near zero ozone depletion properties desired.

The object of the present invention is to provide novel compositions that can serve as blowing agents for thermosetting foams that provide unique characteristics to meet the demands of low or zero ozone depletion potential, lower global warming potential and exhibit low toxicity.

SUMMARY OF THE INVENTION

The present invention relates to the use of blowing agents with negligible (low or zero) ozone-depletion and low GWP based upon unsaturated halogenated hydroolefins. The blowing agents comprise the hydrochlorofluoroolefin (HCFO), 1-chloro-3,3,3-trifluoropropene (HCFO-1233zd) alone or in a combination including a hydrofluoroolefin (HFO), a hydrochlorofluoroolefin (HCFO), a hydrofluorocarbon (HFC), a hydrocarbon, an alcohol, an aldehyde, a ketone, an ether/diether or carbon dioxide. The HCFO-1233zd of the present invention is predominantly the trans isomer of HCFO-1233zd.

Trans (E) and cis (Z) isomers are illustrated:

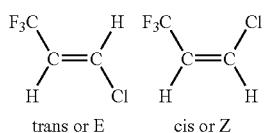

trans or E    cis or Z

Hydrochlorofluoroolefin (HCFO) HCFO-1233 has been proposed as blowing agents which exhibit a low global warming potential and a low ozone depletion value. The low global warming potential and a low ozone depletion value are a result of the atmospheric degradation of the hydrohaloolefins.

The predominately trans isomer of the hydrochlorofluoroolefin HCFO-1233zd, alone or in a combination with HFOs can be used as a foaming agent for thermosetting foams by being mixed in a polyols mixture. The resulted products show superior quality including decreased density and improved k-factor. The foaming agent readily dissolves in thermosetting polymers, and provides a degree of plasticization sufficient to produce acceptable foams. HCFO 1233zd is a liquid at ambient temperature, which allows for ease of handling as is desired by various industries particularly for polyurethane foams. The preferred HFO component typically contains 3 or 4 carbons, and including but not limited to pentafluoropropene, such as 1,2,3,3,3-pentafluoropropene (HFO 1225ye), tetrafluoropropene, such as 1,3,3,3-tetrafluoropropene (HFO 1234ze), 2,3,3,3-tetrafluoropropene (HFO 1234yf), 1,2,3,3-tetrafluoropropene (HFO1234ye), trifluoropropene, such as 3,3,3-trifluoropropene (1243zf). Preferred embodiments of the invention are blowing agent compositions of unsaturated halogenated hydroolefins with normal boiling points less than about 60° C.

The preferred blowing agent composition, either HCFO-1233zd, predominately the trans isomer, alone or in a combination, of the present invention exhibits good solubility in polyol mixture used in producing polyurethane and polyisocyanurate foams. A major portion of the HCFO-1233zd component of the present invention is the trans isomer. It was discovered that the trans isomer exhibits a significantly lower genotoxicity in AMES testing than the cis isomer. A preferred ratio of trans and cis isomers of HCFO-1233zd is less than about 30% weight of the combination of the cis isomer, and preferably less than about 10% of the cis isomer. The most preferred ratio is less than about 3% of the cis isomer. The preferred blowing agent combination produces foam having desirable levels of insulating value.

The HCFO-1233zd of the present invention may be used in combination with other blowing agents including but not limited to: (a) hydrofluorocarbons including but not limited to difluoromethane (HFC32); 1,1,1,2,2-pentafluoroethane (HFC125); 1,1,1-trifluoroethane (HFC143a); 1,1,2,2-tetrafluorothane (HFC134); 1,1,1,2-tetrafluoroethane (HFC134a); 1,1-difluoroethane (HFC152a); 1,1,1,2,3,3,3-heptafluoropropane (HFC227ea); 1,1,1,3,3-pentafluoropropane (HFC245fa); 1,1,1,3,3-pentafluorobutane (HFC365mfc) and 1,1,1,2,2,3,4,5,5,5-decafluoropentane (HFC4310mee). (b) hydrofluoroolefins including but not limited to tetrafluoropropenes (HFO1234), trifluoropropenes (HFO1243), all tetrafluorobutene isomers (HFO1354), all pentafluorobutene isomers (HFO1345), all hexafluorobutene isomers (HFO1336), all heptafluorobutene isomers (HFO1327), all heptafluoropentene isomers (HFO1447), all octafluoropentene isomers (HFO1438), all nonafluoropentene isomers (HFO1429), (c) hydrocarbons including but not limited to, pentane isomers, butane isomers, (d) C1 to C5 alcohols, C1 to C4 aldehydes, C1 to C4 ketones, C1 to C4 ethers and diethers and carbon dioxide, (e) HCFOs such as 2-chloro-3,3,3-trifluoropropene (HCFO-1233xf) and dichlorotrifluoropropene (HCFO1223).

The foamable compositions of the present invention generally include one or more components capable of forming foam having a generally cellular structure and a blowing agent, typically in a combination, in accordance with the present invention. In certain embodiments, the one or more components comprise a thermosetting composition capable of forming foam and/or foamable compositions. Examples of thermosetting compositions include polyurethane and polyisocyanurate foam compositions, and also phenolic foam compositions. In such thermosetting foam embodiments, one or more of the present compositions are included as or part of a blowing agent in a foamable composition, or as a part of a two or more part foamable composition, which preferably includes one or more of the components capable of reacting and/or foaming under the proper conditions to form a foam or cellular structure.

The invention also relates to foam, and preferably closed cell foam, prepared from a polymer foam formulation containing a blowing agent comprising the compositions of the present invention. In yet other embodiments, the invention provides foamable compositions comprising thermosetting foams, such as polyurethane and polyisocyanurate foams, preferably low-density foams, flexible or rigid.

It will be appreciated by those skilled in the art that the order and manner in which the blowing agent combination of the present invention is formed and/or added to the foamable composition does not generally affect the operability of the present invention. For example, in the case of polyurethane foams, it is possible that the various components of the blowing agent combination, and even the components of the present composition, not be mixed in advance of introduction to the foaming equipment, or even that the components are not added to the same location in the foaming equipment. Thus, in certain embodiments it may be desired to introduce one or more components of the blowing agent combination in a blender with the expectation that the components will come together in the foaming equipment and/or operate more effectively in this manner. Nevertheless, in certain embodiments, two or more components of the blowing agent combination are combined in advance and introduced together into the foamable composition, either directly or as part of premix that is then further added to other parts of the foamable composition.

EXAMPLES

Example 1

The formulations tested (all had an Iso Index on ROH of 114) each contained Rubinate M, a polymeric methylene diphenyl diisocyanate (MDI) available from Huntsman; Jeffol R-425-X, a polyol from Huntsman; Voranol 490, a polyol from Dow Chemical, Terate 2541, a polyol from Invista. Antiblaze 80 is a flame retardant from Rhodia; Tegostab B 8404 is a surfactant from Goldschmidt Chemical Corporation. Polycat 8 and 5 (pentamethyldiethylenetriamine, PMDETA) are available from Air Products. Total blowing level is 24.5 mls/g. Table 1 summarizes the properties of the formulation tested.

TABLE 1

| Formulation | % (Weight) |
|---|---|
| Jeffol R-425-X | 10.33 |
| Voranol 490 | 17.21 |
| Terate 2541 | 6.88 |
| Antiblaze 80 | 2.29 |
| Water | 0.79 |
| Tegostab B8404 | 0.69 |
| Polycat 8 | 0.36 |
| PMDETA | 0.12 |
| 1233zd | 8.61 |
| Rubinate M | 52.72 |
| Total | 100.00 |

The A-side (MDI) and B-side (mixture of the polyol, surfactant, catalysts, blowing agent, and additives) were mixed with a hand mixer and dispensed into a container to form a free rise foam. When making a free rise foam, the dispensed material was allowed to expand in an open container. The resulting foam had a 26-second gel time, and 41-second tack free time, a free rise density of 1.69 lb(s)/ft$^3$ (lb/ft$^3$). When making a molded foam, the dispensed material was allowed to expand in a closed mold. The mold was kept closed for a few minutes before releasing the foam. The k-factor measurements (ASTM C518) on the resulting foams were conducted at between 10 and 130° F. Initial k-factors are taken within 24 hours after removing foam skin with a band saw. Lower k-factors indicate better insulation values. The results are summarized in Table 2.

TABLE 2

| Temperature ° F. | K<br>Btu · in./ft$^2$ · h · ° F. |
|---|---|
| 17.6 | 0.1271 |
| 32.0 | 0.1285 |
| 50.0 | 0.1320 |
| 75.2 | 0.1398 |
| 104.0 | 0.1499 |

Example 2

In the following examples, the foam was made by small polyurethane dispenser unless otherwise specified. The dispenser consisted of two pressurized cylinders, one for the A side (MDI) and one for the B side (polyol mixtures). The pressure in the cylinders could be adjusted by regulators. B-side mixtures were pre-blended and then charged into pressurized cylinders. Blowing agents were then added into B-side cylinder and mixed thoroughly. The cylinders were connected to a dispensing gun equipped with a static mixer. The pressures of both cylinders were adjusted so that desired ratio of the A and B sides could be achieved. The formulations tested (all had an Iso Index on ROH of 110) each contained Rubinate M, a polymeric methylene diphenyl diisocyanate (MDI) available from Huntsman; Jeffol SG-360 and R-425-X, polyols from Huntsman; TEAP-265, a polyol from Carpenter Company. TegostabB 8465 a surfactant available from Evonik-Degussa. Jeffcat TD33A and ZR-70 are catalysts from Huntsman. NP 9.5, a compatibilizer from Huntsman. Total blowing agent level was 26.0 mls/g. Table 3 summarizes the formulations of the study.

TABLE 3

| | Formulations | | |
|---|---|---|---|
| | Formulation (wt %) | | |
| | HCFO1233zd (trans) | HFO1234ze | HFC134a |
| Jeffol SG-360 | 14.77 | 14.93 | 15.35 |
| Jeffol R-425-X | 4.22 | 4.27 | 4.39 |
| TEAP-265 | 8.44 | 8.53 | 8.77 |
| DEG | 2.11 | 2.13 | 2.19 |
| Jeffcat TD33A | 0.23 | 0.23 | 0.23 |
| Jeffcat ZR70 | 0.23 | 0.23 | 0.23 |
| Tegostab B8465 | 0.90 | 0.89 | 0.90 |
| NP 9.5 | 6.50 | 6.50 | 6.50 |
| Water | 0.42 | 0.42 | 0.42 |
| HFO1234ze | 0 | 11.56 | 0 |
| HCFO1233zd | 12.11 | 0 | 0 |
| HFC 134a | 0 | 0 | 9.47 |

TABLE 3-continued

| | Formulations | | |
|---|---|---|---|
| | Formulation (wt %) | | |
| | HCFO1233zd (trans) | HFO1234ze | HFC134a |
| Rubinate M | 50.1 | 50.4 | 51.6 |
| A/B | 1.00 | 1.02 | 1.06 |

The k-factor measurements (ASTM C518) on the resulting foams were conducted at between 10 and 130° F. The results are summarized in Table 4. Initial k-factors are taken within 48 hours after removing the foam skin with a band saw. Lower k-factors indicate better insulation values. The results show the k-factor of foam blown with trans HCFO1233zd is superior to foam blown with HFO1234ze or HFC134a.

TABLE 4

Comparison of k-factor of foams

| Temperature (° F.) | HCFO1233zd (trans) | HFO1234ze | HFC134a |
|---|---|---|---|
| | K factor (Btu · in./ft$^2$ · h · ° F.) | | |
| 17.6 | 0.1222 | 0.1337 | 0.1298 |
| 32.0 | 0.1250 | 0.1373 | 0.1343 |
| 50.0 | 0.1302 | 0.1430 | 0.1419 |
| 75.2 | 0.1416 | 0.1542 | 0.1535 |
| 104.0 | 0.1549 | 0.1677 | 0.1670 |

Table 5 shows that at the same blowing level, foams blown with trans HCFCO1233zd exhibits a lower density and higher blowing efficiency than foams blown with HFO1234ze or HFC134a.

TABLE 5

Comparison of free-rise density of HFC134a and HCFO1233zd (trans) foam

| Blowing agent | Free Rise Density (pcf) |
|---|---|
| HCFO1233zd (trans) | 1.71 |
| HFO1234ze | 1.78 |
| HFC134a | 2.01 |

Although the invention is illustrated and described herein with reference to specific embodiments, it is not intended that the appended claims be limited to the details shown. Rather, it is expected that various modifications may be made in these details by those skilled in the art, which modifications may still be within the spirit and scope of the claimed subject matter and it is intended that these claims be construed accordingly.

The invention claimed is:

1. A polyurethane foam composition comprising a polymer blowing agent composition comprising carbon dioxide and the hydrochlorofluoroolefin 1233zd wherein about 99 wt % or more of said hydrochlorofluoroolefin 1233zd is the trans stereoisomer of hydrochlorofluoroolefin 1233zd.

2. The polyurethane foam composition of claim 1, wherein the polymer blowing agent composition further comprises a hydrofluorocarbon.

3. The polyurethane foam composition of claim 2, wherein said hydrofluorocarbon is selected from the group consisting of difluoromethane (HFC32); 1,1,1,2,2-pentafluoroethane (HFC125); 1,1,1-trifluoroethane (HFC143a); 1,1,2,2-tetrafluoroethane (HFC134); 1,1,1,2-tetrafluoroethane (HFC134a); 1,1,-difluoroethane (HFC152a); 1,1,1,2,3,3,3-heptafluoropropane (HFC227ea); 1,1,1,3,3-petanfluoropropane (HFC245fa); 1,1,1,3,3-pentafluorobutane (HFC365mfc) and 1,1,1,2,2,3,4,5,5,5-decafluoropentane (HFC4310me).

4. The polyurethane foam composition of claim 1, wherein the polymer blowing agent composition further comprises a hydrofluoroolefin.

5. The polyurethane foam composition of claim 4, wherein said hydrofluoroolefin is selected from the group consisting of tetrafluoropropenes; trifluoropropenes; tetrafluorobutene isomers; pentafluorobutene isomers; hexafluorobutene isomers; heptafluorobutene isomers; hepatfluoropentene isomers; octafluoropentene isomers; and nonafluoropentene isomers.

6. The polyurethane foam composition of claim 1, wherein the polymer blowing agent composition further comprises an additive selected from the group consisting of hydrocarbons, C1 to C5 alcohols, C1 to C4 aldehydes, C1 to C4 ketones, C1 to C4 ethers, and C1 to C4 diethers.

7. The polyurethane foam composition of claim 6, wherein said hydrocarbon is selected from the group consisting of pentane isomers and butane isomers.

8. The polyurethane foam composition of claim 1, wherein the polymer blowing agent composition further comprises a hydrochlorofluoroolefin other than HCFC-1233zd.

9. The polyurethane foam composition of claim 4, wherein said hydrofluoroolefin is selected from the group consisting of HFO-1234; HFO-1243; HFO-1354; HFO-1345; HFO-1336; HFO-1327; HFO-1447; HFO-1438; and HFO-1429.

* * * * *